US005192613A

United States Patent [19]

Work, III et al.

[11] Patent Number: 5,192,613

[45] Date of Patent: Mar. 9, 1993

[54] ELECTROGRAPHIC RECORDING ELEMENT WITH REDUCED HUMIDITY SENSITIVITY

[75] Inventors: Ray A. Work, III, Kennett Square, Pa.; Clifford E. Milner, Rochester, N.Y.; Sarah J. Kintner, Wilmington, Del.; James E. Genthe, Chillicothe, Ohio; Stephen Strella, Boca Raton, Fla.; Charles R. Iacovella, Monroe, N.Y.

[73] Assignee: E. I. Du Pont de Nemours and Company, Wilmington, Del.

[21] Appl. No.: 620,251

[22] Filed: Nov. 30, 1990

Related U.S. Application Data

[63] Continuation-in-part of Ser. No. 471,150, Jan. 26, 1990, abandoned.

[51] Int. Cl.[5] ........................ B32B 7/02; G01D 15/06

[52] U.S. Cl. .................................... 428/363; 428/922; 428/355; 428/402; 428/403; 428/404; 428/402.24; 428/363; 428/451; 428/452; 428/500; 428/537.5; 428/697; 252/518

[58] Field of Search ................ 252/518; 428/922, 355, 428/403, 404, 917, 690, 446, 480, 30, 402, 402.24, 405, 192, 341, 363, 451–452, 500, 537.5, 697; 301/212

[56] References Cited

U.S. PATENT DOCUMENTS 4,246,143 1/1981 Sonoda et al. ...................... 252/518
4,336,338 6/1982 Down et al. .......................... 501/12
4,389,451 6/1983 Fujioka et al. ...................... 428/212
4,540,629 9/1985 Sands et al. ......................... 428/402

FOREIGN PATENT DOCUMENTS 0025583 3/1981 European Pat. Off. .
2025264 1/1980 United Kingdom .

OTHER PUBLICATIONS

Tsunashima J. Mat. Sci., (1986), 2731–2734.

*Primary Examiner*—Ellis P. Robinson
*Assistant Examiner*—Charles R. Nold

[57] ABSTRACT

Electrographic recording element with reduced humidity sensitivity comprising (1) a base, e.g., paper, polymer film,
(2) a conductive layer of a continuous coating of an electroconductive composition comprising
  (a) polymeric binder,
  (b) electroconductive powder comprising amorphous silica or a silica-containing material in association with a two-dimensional network of antimony-containing tin oxide crystallites in which the antimony content ranges from 1 to about 30% by weight of tin oxide; and
(3) a dielectric layer.

Mixtures of two or more different sized electroconductive powder particles can be used.

The electrographic recording element is useful for recording high-speed computer element, e.g., in geophysical mapping, weather map printing, architectural and engineering drawings, etc.

36 Claims, No Drawings

ELECTROGRAPHIC RECORDING ELEMENT WITH REDUCED HUMIDITY SENSITIVITY

CROSS REFERENCE TO RELATED APPLICATION

This application is a continuation-in-part of application Ser. No. 07/471,150, filed Jan. 26, 1990, is now abandoned.

FIELD OF THE INVENTION

This invention relates to an electrographic recording element More particularly this invention relates to an electrographic recording element with reduced humidity sensitivity comprising (a) a base, (b) a conductive layer comprising an electroconductive composition comprising a polymeric binder and an electroconductive powder, and (c) a dielectric layer.

BACKGROUND OF THE INVENTION

Electrographic recording elements, also known as electrographic recording materials, electrostatic imaging materials, or dielectric recording materials, comprise a conductive base and a dielectric coating. In use, an electrical charge pattern is applied to the dielectric coating, by, for example, an array of styli or other electrodes. To produce an image, this charge pattern is made visible by the application of a toner, normally in the form of a dry powder or a non-aqueous dispersion. To form a permanent image, the toned image is fixed by, for example, heating or by removal of the solvent.

Paper, polymeric film, or other sheet material may be used as the base for the dielectric coating. The base is normally rendered conductive by means of a electroconductive composition, which may be applied at the size bath, in the case of paper, or by other coating means. Salts, most usually polymeric quaternary ammonium compounds, such as are described in Schaper et al. U.S. Pat. No. 3,486,932, have been used as electroconductive compositions In a typical conventional electrostatic recording element, a dielectric layer is formed on a base covered with an electroconductive layer with a surface-specific resistivity of $10^5$ to $10^9$ ohms. The surface-specific resistivity of the electroconductive layer, may, however, drop below $10^5$ ohms, or exceed $10^9$ ohms, depending on the humidity. Due to the effects of humidity, the optical density of the image may decrease, or, in extreme cases, recording may become totally impossible.

Humidity sensitivity is due to the nature of the electroconductivity of the electroconductive composition. For salts, such as polymeric quaternary ammonium compounds, the electroconductivity of the electroconductive composition is due to ionic conduction. Therefore, the resistivity of the element is affected by its water content. When the electroconductive base is left in low humidity for a long time, its water content decreases, causing the ionizing capacity to deteriorate with a resultant increase in resistivity. If the dielectric recording element is left in high humidity, its water content increases with a resultant decrease in resistivity.

To overcome this problem, non-ionic conductive fillers, for example: powders of metals such as nickel, copper, and aluminum; silver powder; carbon black; conductive fibers; copper iodide powder; and synthetic hectorite clays, have also been used in electroconductive compositions. However, oxide films are produced on the surfaces of metal powders increasing their contact resistance; silver powder is expensive; and carbon black, conductive fibers, copper iodide powder, and clays can impart unwanted color and opacity to the electrographic recording element.

Thus, a need exists for an electroconductive composition containing a non-ionic electroconductive powder which has a high and stable electroconductivity; is relatively insensitive to humidity; is inexpensive; has uniform properties, such as particle size and composition; and does not impart undesirable color and opacity to electrographic recording elements.

SUMMARY OF THE INVENTION

In accordance with this invention, there is provided an electrographic recording element with reduced sensitivity to humidity, comprising, in order:

(1) a base, (2) a conductive layer comprising a continuous coating of an electroconductive composition, said electroconductive composition comprising:

(a) a polymeric binder and (b) an electroconductive powder, said electroconductive powder comprising amorphous silica or a silica-containing material in association with a two-dimensional network of antimony-containing tin oxide crystallites in which the antimony content ranges from 1 to about 30% by weight of tin oxide; and (3) a dielectric layer.

In a preferred embodiment of this invention the electroconductive powder comprises shaped particles of amorphous silica, or a silica-containing material, which are surface-coated with the two-dimensional network of antimony-containing tin oxide crystallites. In a more preferred embodiment of this invention the base is paper or a polymer film. A preferred polymer film for electrographic recording film is polyethylene terephthalate. In an even more preferred embodiment of the electrographic recording film, both the dielectric layer and the polymeric binder are the same cross-linked polymer. A preferred coating solvent for both the dielectric layer and the conductive layer is water A preferred powder/polymer ratio is about 0.6 to about 1.3.

DETAILED DESCRIPTION OF THE INVENTION CONDUCTIVE LAYER

The conductive layer comprises a continuous coating of an electroconductive composition comprising (a) a polymeric binder and (b) an electroconductive powder. The electroconductive composition produces a conductive layer that does not vary in conductivity as the ambient relative humidity is varied between at least 30% and 70%.

Electroconductive Powders

The electroconductive powder comprises a two-dimensional network of antimony-containing tin oxide crystallites which exist in a unique association with amorphous silica or with silica containing material. Particles of this composition are capable of forming an interconnecting conductive network when incorporated as a component within a carrier matrix. The conductive powder may be a "filled type" or a "shell type" as herein described. The preparation and properties of the electroconductive powders used in the practice of this invention are disclosed in coassigned U.S. patent application Ser. No. 07/386,765, filed Aug. 2, 1989, abandoned Dec. 4, 1991 the teachings of which are incorporated herein by reference.

The electroconductive powder particles which comprise the two-dimensional network of antimony-containing tin oxide crystallites with amorphous silica or with silica-containing material are prepared by a process comprising the steps of:

(a) providing a substrate of amorphous hydroxylated silica or active silica-containing material, (b) applying an outer coating layer to the substrate surface consisting essentially of hydrous oxides of antimony and tin, and (c) calcinating the coated substrate at a temperature in the range of 400° to 900° C. in oxygen-containing atmosphere.

The term "silica-containing material" as used herein means materials, i.e., compositions, such as metal silicates, silica-containing glasses, or, in general, materials having an extensive covalent network involving $SiO_4$ tetrahedra.

Generally speaking, maximum utility is realized when the substrate comprises a powder, i.e., finely divided particles which are tens of microns to sub-micron in size. The powder particles are composed of amorphous silica or a silica-containing material, or they are composed of an inert core material having an amorphous silica coating or a coating of a silica-containing material.

An important criterion for the silica, or silica-containing, substrate is that, when converted to an electroconductive powder, it is capable of forming an interconnecting electroconductive network within a thin film of polymeric material. Particle shapes which are capable of forming such an effective interconnecting network and which are contemplated for use in forming the electroconductive powders are selected from rods, whiskers, platelets, fibers, needles, shells and shell parts, and the like. Particles which are equiaxial or nearly equiaxial in shape may also be used.

Polymeric materials may be conveniently rendered conductive by filling the polymer composition with powder of equiaxial, i.e., generally spherical, particles. While it will be appreciated that the preferred particle shape for any specific application will depend on many factors, in general, equiaxial or nearly equiaxial shaped particles are generally preferred for use in electrographic recording media.

Formation of the silica substrate can be accomplished by first suspending the core material in water and then adding active silica while maintaining the pH of the suspension at a value in the range of 8 to 11. This procedure is described in greater detail in Iler U.S. Pat. No. 2,885,366, the teachings of which are incorporated herein by reference. In general, active silica is very low molecular weight silica, such as silicic acid or polysilicic acid or metal silicates, which may be added as such to the suspension, or formed in situ as by the reaction of an acid with a silicate.

In "shell type" electroconductive powders the substrate of amorphous silica is a hollow shell which is prepared by coating a finely divided core material with active silica and then removing the core material, leaving behind a silica shell as the substrate for receiving the antimony-containing tin oxide surface coating layer. The primary function of the core material is merely to provide a shaped particle on which the amorphous silica substrate can be deposited. The core material must, of course, largely maintain its physical stability during the silica coating process.

Suitable core materials for "shell type" electroconductive powders are carbonates such as, for example, barium carbonate, and calcium carbonate Other materials may also be used provided that they will readily accept an adherent skin of amorphous hydroxylated silica; they have low solubility at the coating conditions; they can be easily removed from the silica shell by a variety of techniques including extraction, reaction and oxidation; and their chemical composition will not interfere with application of the tin oxide coating layer The use of barium carbonate, calcium carbonate or strontium carbonate as the core material is particularly advantageous because each can provide an in situ source of grain refiner, the importance of which is discussed below.

The core material may also remain encapsulated within the shell of amorphous silica or silica-containing material, i.e., it is not removed. Electroconductive powders in which the core material has not been removed are know as "filled type" electroconductive powders. The term "filled type" electroconductive powder includes both those powders with core materials such as calcium carbonate in which the core material, though removable, has not been removed, as well as those powders which contain a core material such as mica which can only be removed with great difficulty, if at all. In the case of either "filled type" or "shell type" electroconductive powders, the silica coating is coherent and is bound upon the core material forming a coating layer which is substantially uniform in thickness from about 5 to 20 nm.

Preparation of Silica Particles

In practice, an aqueous suspension, i.e., dispersion, of the desired core material is prepared, and the dispersion is brought to a pH of 10 by adding an appropriate amount of an alkali, such as sodium hydroxide, potassium hydroxide, or ammonium hydroxide. The particles comprising the core material should generally have a specific surface area (BET method nitrogen adsorption) in the range of 0.1 to 50 $m^2/g$, but for best results a specific surface area of 2 to 8 $m^2/g$ is preferred. In general, the preferred surface area will be in the lower part of the above range for high density materials and in the higher part of the above range for low density materials.

The concentration of the core material in the dispersion is not especially critical It can range from 100 to 400 gm/L, but for best results the dispersion should be uniform. After the dispersion of the core material has been prepared, a soluble silicate, such as sodium silicate or potassium silicate, is added to facilitate the formation of the silica coating. A convenient form of sodium silicate is a clear aqueous solution with a $SiO_2/Na_2O$ molar ratio of 3.25/1 which has been filtered to remove all insoluble residue. A range of 2 to 50% by weight of silica based on the amount of core material in the dispersion can be added, but 6 to 25% by weight of silica is preferred. To promote the reaction, the dispersion, i.e., slurry, is heated to a temperature in the range of about 60° to 100° C.

The alkali component of the sodium silicate or potassium silicate is next neutralized by slowly adding a dilute acid to the slurry over a period of time dictated by the amount of silica present so that formation of "free" silica, i.e., silica particles which are not attached to the core material, is avoided. Mineral acids, such as sulfuric, hydrochloric, nitric, and the like, are suitable for the neutralization. The larger the amount of silica present, the longer will be the time required for neutralization; however, a silica deposition rate of 3% of the weight of substrate powder per hour is normally satisfactory to insure formation of the silica coating layer. The important consideration is to keep the addition rate slow enough to avoid precipitating free silica. The slurry is then held at temperature for at least 0.5 hour after neutralization to ensure a complete reaction of the hydroxylated silica coating layer. The silica coated particles can then be isolated, washed, and dried prior to beginning the next step of the process, or they can be retained as a slurry, and the process continued.

Alternatively, the amorphous hydroxylated silica may be prepared by simultaneously adding the alkali silicate solution and the acid solution to a heel, i.e., a predetermined amount, of alkaline water. With this technique, the pH can be kept constant throughout most of the reaction. Under certain circumstances, this can facilitate the uniform coating of the silica onto the substrate.

Hydroxylated silica, i.e., silica containing surface hydroxyl groups, may be obtained by precipitating the silica from aqueous solution under alkaline conditions. For convenience, and at the option of the operator, the silica substrate can be formed without the use of a core material by precipitating the silica from solution. Preferred amorphous hydroxylated silicas are obtained by carrying out the precipitation slowly (over 1-3 hr) and at elevated temperatures, such as around 90° C. Under these processing conditions, the silica is coherent, i.e., the silica adheres to the substrate, i.e., the core material, and takes the general shape of the core particle. Typically, particles coated with a coherent silica coating will have a surface area, by nitrogen adsorption, which is approximately the same as, or slightly lower than, the area of the uncoated powder Particles with a non-coherent, e.g., porous, silica coating will have much higher surface areas, as much as 10 to 100 times higher. While coherent coatings are preferred for the preparation of the electroconductive powder particles, a moderate degree of porosity in the coating is not particularly harmful In particular, in the preparation of hollow shells, a small amount of porosity is beneficial in facilitating removal of the core material.

As noted above, the formation of the amorphous hydroxylated silica is preferably carried out at a temperature of 60° to 90° C. to facilitate densification of the silica. However, lower temperatures in the range of 45° to 75° C. can be used if a densification aid, such as, for example, boron oxide, is present in the reaction mixture.

When the process is continued from previously dried silica coated particles, they are first re-dispersed in water, and the resulting slurry is heated to a temperature in the range of about 40° to 100° C. Next, the core material may be removed by treating, for example, with an acid. This may be accomplished by heating an aqueous slurry of the silica coated particles to 40° to 100° C., adding, for example, hydrochloric acid while stirring until the pH reaches a value in the range of 1.5 to 3.5, but preferably the pH should be 2.0 for best results. The core material dissolves, leaving hollow shaped particles of amorphous silica which are the substrates onto which the antimony-doped tin oxide coating is applied. The choice of solvent is critical; a solvent which will react with the core material to form an insoluble product should not be used. For example, when barium carbonate is the core material, an appropriate solvent is hydrochloric acid, which dissolves the barium carbonate liberating carbon dioxide and barium ions in solution The core material can be removed by other means, such as, for example, by oxidation during calcining where the core material is a graphite powder Other core materials which can be dissolved by appropriate reagents include metal powders, such as aluminum or copper powder, and metal oxides, such as iron oxide.

As previously mentioned, the core material may remain encapsulated throughout final processing. The presence or absence of a core material may enhance certain optical or other properties and is for the convenience of the operator. The use of a removable core material, especially barium carbonate or calcium carbonate, facilitates the formation of a shaped amorphous silica substrate. Alternatively, any convenient source of amorphous hydroxylated silica or hydroxylated silica-containing material, preferably hydroxylated silica, can be used as a substrate to prepare the electroconductive powders used in this invention.

Conductive Coating

The outer conductive coating layer can be applied to the amorphous hydroxylated silica substrate by preparing separate aqueous solutions of hydrolyzable tin and antimony salts and adding them simultaneously to the substrate slurry along with an appropriate amount of a strong base to maintain the pH of the slurry in the desired range. While it is generally preferred to add the tin and antimony solutions simultaneously, and indeed they may conveniently by first mixed together and then added as one solution, it is also possible to add the solutions sequentially.

Solvents for preparing the individual tin and antimony salt solutions can be any solvent which dissolves the salt without adverse reaction However, water or acidic aqueous solutions are preferred solvents. The tin salt solution may conveniently be prepared by dissolving $SnCl_4.5H_2O$ in water. The antimony salt solution may conveniently be prepared by dissolving $SbCl_3$ in a nominal 37% aqueous solution of hydrochloric acid. Tin and antimony chlorides are the preferred salts, but other salts, such as, for example, sulfates, nitrates, oxalates, and acetates, can be used. In general, tetravalent tin salts and trivalent antimony salts are preferred as starting materials. Although the concentration of the salts in solution is not critical, it is preferred that the concentrations are kept within the practical ranges of 50 to 300 g $SnO_2$/L and 0.5 to 250 g Sb/L to facilitate uniform coating while avoiding unnecessary dilution.

According to one method for preparing the electroconductive powder particles used in the practice of this invention, the individual tin and antimony salt solutions can be combined into a single solution which is then added to the slurry slowly over a predetermined period of time based on the percent $SnO_2$(Sb) being added. Typically, a rate of 25% of the total $SnO_2$ and Sb can be added per hour. Rapid addition of the $SnO_2$(Sb) solution will result in nonuniform coating of the $SnO_2$(Sb) onto the silica substrate while very slow addition of the solution will unnecessarily prolong the operation. The temperature of the slurry during deposition of the antimony-doped tin oxide coating layer is maintained in the range of 25° to 100° C. under continuous agitation.

In a preferred method of preparation for the electroconductive powders, and a critical feature of the method, simultaneously with the addition of the salts to the slurry, the pH of the system is kept constant at a value of from 1.5 to 3.5, most preferably at 2.0, by adding alkali, e.g., sodium hydroxide, potassium hydroxide, or the like during the addition. In this pH range the hydroxylated silica surface of the substrate becomes very receptive to an association with, i.e., the deposition of, hydrous oxides of tin and antimony. Brief excursions of pH to levels above or below the 1.5 to 3.5 range are generally not harmful, but extensive processing substantially outside this range will degrade the continuity of the two-dimensional network of antimony-doped tin oxide crystallites and, thus, will adversely affect the conductive properties of the resulting electroconductive powder particles.

The tin and antimony salts hydrolyze and deposit on the surface of the silica to form a generally uniform layer typically having a thickness in the range of about 5 to 20 nm, and more typically a thickness of about 10 nm. After calcination, the $SnO_2(Sb)$ crystals are typically about 10 nm in diameter, but individual crystals may be as large as 20 nm in diameter or larger. It has been observed that as the quantity of antimony-containing tin oxide in the outer coating layer increases, the resistivity of the electroconductive powder will decrease, i.e., the conductivity will increase. Generally, the antimony content of the tin oxide layer can range from 1 to 30% by weight of the tin oxide, but best results are achieved when the antimony content is about 10% by weight.

The coated particles obtained in this manner are then isolated by any convenient solid-liquid separation procedure, such as, for example, by filtration, and then washed free of salts with water and dried. Drying can be conveniently accomplished at a temperature of up to about 120° C.; however, drying is optional if the particles are to be calcined immediately following isolation and washing.

The isolated particles are next calcined in an oxygen-containing atmosphere at a temperature in the range of from 400° to 900° C., preferably 600° to 750° C., for a period of time sufficient to develop the crystallinity of the tin oxide phase and establish the conductivity. While the time required for calcination will depend, for example, on the temperature and on the geometry of the furnace, it is typically from 1 to 2 hours. Calcination is critical to the preparation of the electroconductive powder particles because it serves to perfect the crystal phase of the antimony-containing tin oxide outer coating layer which, in turn, imparts electroconductivity to the particles.

Grain Refiners

The conductive properties of the electroconductive powder particles can be enhanced by carrying out the deposition of the antimony-containing tin oxide outer coating layer in the presence of a grain refiner, or a mixture of grain refiners, selected from the group consisting of cations of alkali metals, alkaline earth metals, transition metals and rare earth elements. These cations enhance the uniformity of $SnO_2$ deposition on the $SiO_2$ surface and minimize grain growth during subsequent calcination.

Concentrations of as little as 500 parts per million or up to about 2 molar or higher of grain refiner, or mixture of grain refiners, in the slurry during the deposition of the tin oxide conducting phase result, after calcination, in improved electroconductive properties of the electroconductive powder particles. Ordinarily, the finished electroconductive powder particles will contain from about 100 parts per million to 1% by weight of the grain refiner used, although higher concentrations of grain refiner, e.g., up to about 10% by weight, may be present in the particles. Preferred grain refiners are cations of barium, calcium, magnesium, and strontium, although cations of alkali metals, rare earth metals, other alkaline earth metals and certain transition metals, such as iron and zinc, are expected to produce satisfactory results.

Physical Properties

The electroconductive powder particles are characterized by a high surface area (determined by nitrogen adsorption) relative to the surface area that would be expected for the average particle size as observed by electron microscopy. As previously noted, the electroconductive powder particles are typically submicron to tens of micrometers in size. As observed under an electron microscope, the silica surface is seen to be densely populated with fine crystallites of antimony-doped tin oxide, each crystallite typically in the range of 5 to 20 nm. This crystallite size range is confirmed by X-ray diffraction line broadening. The high surface area results from the population of fine crystallites. The actual surface area, as measured by nitrogen adsorption, is typically in the range of 30 to 60 $m^2/g$, but higher or lower surface areas are possible depending on the exact processing conditions.

Polymeric Binder

Although care must be taken to see that the binder does not adversely affect the conductive properties of the electroconductive layer, a number of materials, ranging from gelatin to organic polymers of several types, may be used. Examples of suitable binders are photographic grade gelatin, aqueous acrylic polymer emulsions, aqueous acrylate/styrene copolymer dispersions, and aqueous poly(vinylidene chloride) suspensions.

If the same binder is used in both the conductive layer and the dielectric layer, incompatibilities during coating are avoided. Suitable binders for this application are Nacrylic® 78-6178, a carboxylated acrylic polymer made by National Starch & Chemical Co., and Rhoplex® TR 407, an acrylic polymer manufactured by Rohm and Haas. Each of these polymers is coated from water, thus avoiding the disadvantages of coating from organic solvents discussed below.

In addition, it has been found that, in general, if a polymer, which is not self-crosslinking such as Nacrylic® 78-6178, is used in each layer, the charge decay characteristics of the dielectric recording element are improved if the polymer in each layer is crosslinked with about 5–10% (based the dry weight of the polymer) of a cross-linking agent. Suitable cross-linking agents are polyfunctional aziridines, such as PFAZ® 322 or XAMA-7. When the polymer in each layer is crosslinked with one of these materials, excellent decay performance is observed over the 30–70% relative humidity range.

Base

The base used in the electrographic recording elements of this invention can be various sheet materials, including both paper and polymeric films. Base papers may be translucent or opaque. In either case, the base paper is preferably made from wet-beaten stock. The weight of the paper may vary over a wide range, for example 40–120 gm/m$^2$. The paper may also be calendered to enhance its smoothness. Chemically transparentized papers may also be used.

For certain applications, it may be desirable to provide direct electrical contact to the conductive layer by, for example, back coating (i.e., coating on the side opposite the conductive and dielectric layers) with an aqueous salt solution, such as one containing 1:1 sodium nitrate and Calgon® XLV, or a grounding stripe on one or both edges of the paper. Back coating is conveniently done after the conductive layer and dielectric layer have been applied. The ionic conductor may also be size pressed into the paper. A convenient method of adding a grounding stripe is to coat a carbon dispersion on each edge of the film and allow the solvent to evaporate.

For the preparation of electrographic recording films, polymer films which are transparent and dimensionally stable are required. Suitable polymer films include polyethylene terephthalate, polyethylene, and the like. While the thickness of the polymer film is not critical, films of 0.003–0.008 in (75–200 μm) may be used. The film may contain conventional coatings, such as a gelatin sub-coat, provided the electrical properties of the element required for the practice of this invention are not adversely affected.

To improve the properties of the electrographic recording film, such as transport properties in the recording device, the back side of the base, i.e, the side opposite that on which the conductive and dielectric layers are coated, may also be coated with conventional coatings. The film may also be surface roughened with, for example, 10–18 μm matte, to improve the image quality.

Dielectric Coating

The dielectric coating determines the electrostatic charge accepted by the film and the time duration over which it will hold the charge. In addition, it must have sufficient dielectric strength to support the charging current without breakdown. Typically, a highly resistive polymer is used for this coating. The dielectric coating may comprise a polymeric material in the form of a latex or resin. The polymeric material may be, for example, a homopolymer or copolymer of the following monomers: vinyl acetate, vinyl chloride, vinylidene chloride, vinyl butyral, an acrylate, a methacrylate, acrylonitrile, ethylene, styrene, or butadiene. These materials are typically coated from organic solvents.

Water dispersible polymers such as carboxylated acrylics, carboxylated poly(vinyl acetate), and poly(vinyl butyral) have been used to prepare coatings which can be deposited from aqueous formulations. If water dispersible polymers are used, the disadvantages of coating from organic solvents, fire and exposure hazards, solvent recovery, etc., can be avoided.

As described above, if the same binder is used in both the conductive layer and the dielectric layer, incompatibilities during coating are avoided. A suitable binder for this application is Nacrylic® 78-6178, a carboxylated acrylic polymer made by National Starch & Chemical Co. This polymer is coated from water, thus avoiding the disadvantages of coating from organic solvents discussed above.

In addition it has been found that, in general, if the polymer in each layer is not self-crosslinking, the charge decay characteristics of the dielectric recording element are improved if the polymer in each layer is crosslinked with about 5–10% (based the dry weight of the polymer) of a cross-linking agent. Suitable cross-linking agents are polyfunctional aziridines, such as PFAZ® 322 or XAMA-7. When polymer in both layers is crosslinked with one of these materials, excellent decay performance is observed over the 30–70% relative humidity range.

If appropriate, the dielectric coating may contain some form of matte or pigment to increase opacity (in the case of paper), improve texture, reduce gloss, and enhance pencil and ink acceptance of the dielectric layer. The pigment may also serve to increase the dielectric constant of the dielectric coating. Conventionally, the pigment may be, for example, calcium carbonate, silica, or a synthetic aluminosilicate; and, optionally, a dispersant for the pigment material. The proportion of pigment used may likewise be conventional, for example, the pigment may comprise from 10 to 50%, preferably about 20%, by weight of the dielectric coating on a dry weight basis. Conventional matte agents are micronized polymers, colloidal silicas and the like.

For certain applications, it may be desirable to place a grounding stripe on one or both edges of the film. A convenient method of adding a grounding stripe is to coat a carbon dispersion on each edge of the film and allow the solvent to evaporate. Usually small amounts of other additives are incorporated into the dielectric coating to achieve the desired balance of functional and esthetic properties. Among these materials are dyes, plasticizers, lubricants, anti-blocking agents, and processing aids.

Manufacture

The electroconductive composition and the dielectric layer are normally applied to the base while it is in web form using conventional web-coating methods, such as bar coating, blade coating, reverse roll coating, Meyer rod coating, and offset gravure coating. The dielectric coating may be applied in a solvent vehicle or as an aqueous dispersion. As described above the use of an aqueous dispersion of the same polymer used for the polymeric binder in the electroconductive composition is preferred. The conductive layer may be coated from about 1 to about 20 gm/m$^2$. For electrographic recording films coating weights in the range of about 1 to about 8 gm/m$^2$ are preferred. The dielectric layer may be coated at from about 4 to about 12 gm/m$^2$ and may be coated as a single layer or as multiple layers.

It is especially important that a smooth, continuous, extremely uniform, flaw free coating of dielectric layer be achieved. Thin spots, pinholes, or coating skips in the dielectric layer increase the tendency for dielectric breakdown. When breakdown occurs, a hole is burned in the coating and a circle of low charge is formed around the point of breakdown. These areas manifest themselves as white untoned circular spots in the finished image. Smoothness is required to prevent excess toner from being picked up during the toning operation.

Either core type or shell type electroconductive powder particles, or mixtures thereof, may be used in the manufacture of the electrographic recording materials of this invention. For electrographic recording films mica based electroconductive powder particles give a film with superior clarity and are preferred.

In some cases, mixtures of two or more different sized electroconductive powder particles may produce superior electrical properties. If the mixture contains two different sizes of particles, mixtures containing about 25% by weight to about 75% by weight of one sized particle, and about 75% by weight to about 25% by weight of the other sized particle, may be used to advantage. Such mixtures may be prepared by mixing batches of different sized powder particles. A useful ratio of particle sizes (μm) is 2 to 1 to 10 to 1, preferably 3 to 1 to 6 to 1. Preferably the median particle sizes are in the range of about 1 to 2.5 micrometers for the shell type particles and about 8 to 30 micrometers for the mica type particles. The batches may be the same type of powder particle, or different types of powder particles may be used. For electrographic recording films, a mixture of mica based electroconductive powder particles of different sizes is preferred.

For the formation of electrographic recording elements powder/binder ratios (weight of electroconductive powder particles/weight of polymeric binder) in the range of about 0.5 to about 1.5 can be used. Powder/binder ratios in the range of about 0.6 to about 1.3 are preferred. A ratio of about 0.7 to about 1.0 is more preferred.

INDUSTRIAL APPLICABILITY

Electrographic recording processes require no impact, are capable of extremely high recording speeds, require low energy levels, and do not require chemical processing. These processes are particularly useful for recording high-speed computer output in such applications as geophysical mapping, weather map printing, and the preparation of architectural and engineering drawings, etc.

The advantageous properties of this invention can be observed by reference to the following examples which illustrate, but do not limit, the invention.

EXAMPLES

In the Examples which follow it should be understood that "coating solution" refers to the mixture of solvent and additives which is coated on the base, even though some of the additives may be in suspension rather than in solution, and that "total solids" refers to the total amount of nonvolatile material in the coating solution even though some of the additives may be nonvolatile liquids at ambient temperature.

GLOSSARY

| GLOSSARY | |
|---|---|
| Acumist ® A12 | 12 μm high melting, chemically modified, micronized polyethylene matte; Allied-Signal, Morristown, NJ |
| Calcofluor ® White RWP | 7-Diethylamino-4-methylcoumarian; 2H-1-benzopyran-2-one, 7-(diethylamino)-; CAS 71173-56-3; American Cyanamide, Wayne, NJ |
| Calgon ® XLV | Calgon Corp., Pittsburgh, PA |
| Carboset ® XL 11 | Acrylic acid/ethyl acrylate/methyl methacrylate copolymer; CAS 25135-39-1; B. F. Goodrich, Cleveland, OH |
| DeSoto Type 342 | Acrylic polymer (57% by weight) in toluene/ethanol; DeSoto, Inc., Des Plains, IL |
| Kasil ® 6 | Silicic acid, potassium salt; potassium silicate solution; CAS 1312-76-1; The PQ Corp., Valley Forge, PA |
| Min-U-Sil ® 10 | 10 μm silica matte; U. S. Silica Co., Berkeley Springs, WV |
| Nacrylic ® 78-6178 | Carboxylated acrylic polymer, 50% solids in water; National Starch and Chemical, Bridgewater, NJ |
| PFAZ ® 322 | 1,1,1-Trimethylolpropane tris(2-methyl-1-aziridine propionate; CAS 64265-57-2; Sybron Chemical, Birmingham, NJ 08011 |
| Rhoplex ® TR 407 | Acrylic polymer (44–46% by weight) in water; CAS 9081-82-7; Rohm and Haas, Philadelphia, PA |
| XAMA | XAMA-7; Pentaerythritol tris(1-aziridine propionate; CAS 57116-45-7; Cordova Corp. |

EXAMPLE 1

This example illustrates the preparation of electroconductive powder particles using mica as the core material.

Sixty-one pounds (22.8 Kg) of wet-ground muscovite mice (median particle size, 8–10 μm; surface area, 8.7 $m^2/gm$) was dispersed in 16 gal (60.6 L) of water, and the pH was adjusted to 10.0 with 40 mL of 30% aqueous sodium hydroxide. The coating tank was a 50 gal (189 L) kettle with an 18 in (46 cm) diameter anchor type impeller spinning at 90 RPM. Over a 5 min period, 15.8 lbs (7.18 Kg) of Kasil ® 6 potassium silicate solution (26.5 wt. % $SiO_2$, 12.5 wt. % $K_2O$) were pumped into the kettle, and the mix was heated to 90° C. over a 20 min period.

Hydrochloric acid (37 lb of 4 wt. % HCl) (16.8 Kg) was added at a rate of 10 lb/hr (4.55 Kg/hr) to the slurry to precipitate the silica onto the mica surface. At the end of the addition, the pH was 7. The slurry was allowed to cure at 90° C. for 0.5 hr. After the cure, the slurry was pumped to a plate and frame filter, filtered, and washed to 200 micro-Mhos with deionized water.

One half of the cake was reslurried in 100 lb (45.5 Kg) of deionized water and charged to the kettle. Calcium chloride solution (56 lb at 28 wt. %) was added to the bath over 0.25 hr. Tin tetrachloride (64.5 lb 50 wt. % tin tetrachloride solution and 21.5 lb water) and antimony trichloride (3.6 lb of antimony trichloride in 8.3 lb 37% HCl) solutions were mixed together and added to the slurry over 2.5 hr. During this time, the pH of the slurry was kept at 2 by continuously feeding 30% sodium hydroxide (about 90 lb).

The product was cured for 0.5 hr at 90° C. and 2 pH, cooled to 60° C., filtered and washed with water to 200 micro-Mhos to remove soluble salts, and dried at 150° C. for 20 hr. The dried product was calcined in air at 750° C. for 2 hr. The mica based electroconductive powder had a surface area of 32 $m^2/gm$.

EXAMPLE 2

This example illustrates the preparation of hollow shell electroconductive powder particles using calcium carbonate as the core material.

In a 50 gal (189 L) glass lined kettle, agitated with an 18 in (46 cm) anchor type impeller turning at 90 RPM, 20 gal (76 L) of deionized water were added and the pH was adjusted to 10.0 using about 10 mL of 30% aqueous sodium hydroxide. Three pounds (1.4 Kg) of Kasil #6 potassium silicate solution (26.5% $SiO_2$, 12.5% $K_2O$) was added to the slurry, followed by 27 lb (12.3 Kg) of Pfizer Albacar H.O. Dry calcium carbonate powder, which had a surface area of 11.4 $m^2/gm$, and the kettle temperature was brought to 90° C. over a 0.5 hr by running steam through a steam jacket. Next, 31 lb (14.1 Kg) of the potassium silicate solution was combined with 50 lb (22.7 Kg) of deionized water and added to the slurry over 4 hr while pH of the slurry was kept above 9.0 by feeding 72 lb (32.7 Kg) of 4 wt. % hydrochloric acid at a steady rate.

After the silicate feed was complete, the slurry was cured for 0.5 hr at 90° C., then the pH was adjusted to 8.0 by adding 8 lb (3.6 Kg) of 30% hydrochloric acid solution. The 8.0 pH slurry was cooled to 60° C., and filtered to dewater.

The filter cake was redispersed in 60 lb (27.3 Kg) of deionized water and charged to the same 50 gal kettle as used above (still at 90 RPM agitator speed), and heated to 90° C. Next, 55 lb (25 Kg) of 30 wt. % hydrochloric acid was added to bring the pH down to 2. Solutions of 45 lb (20.5 Kg) of tin tetrachloride solution (50%) and 15 lb (6.8 Kg) water, and 2.5 lb (1.14 Kg) antimony trichloride and 5.8 lb (2.64 Kg) of 37 wt. % hydrochloric acid were premixed, combined, and fed to the kettle over 2 hr. The pH was kept constant at 2.0 by adding 30 wt. % aqueous sodium hydroxide at about 120 mL/min. When the tin/antimony addition was complete, the slurry was cured for 0.5 hr at 90° C. and 2 pH, cooled to 60° C., filtered, and washed to 200 micro-Mhos with water to remove soluble salts. The product cake was then dried at 150° C. for 20 hr and calcined for 2 hr at 750° C.

The calcined product was coated with 1 wt. % triethanol amine and steam micronized at a rate of 1000 gm/min.

When examined under the electron microscope, the micronized powder from above was found to consist of hollow shells of silica and fragments of shells of silica, with fine crystallites of antimony-doped tin oxide forming a two-dimensional network on the surface of the silica.

The product surface area analysis by nitrogen adsorption was 58.7 $m^2$/gm. The median particle size by Microtrac was 2.32 μm.

Following the procedure of Example 2, except that 1.25 lb (0.57 Kg) of Sb203 and 2.9 lb (1.32 Kg) of 37% wt. % hydrochloric acid used instead of the 2.5 lb of $Sb_2O_3$ and 5.8 lb of 37% wt. % hydrochloric acid solution used in Example 2, a shell type electroconductive powder was prepared. Analysis: $SiO_2$, 37.78%; $SnO_2$, 57.20%; $Sb_2O_3$, 3.58%; CaO, 1.35%.

EXAMPLE 4

This example illustrates the preparation of an electrographic recording film in which the conductive layer contains shell type electroconductive powder particles and is coated from aqueous media.

Step 1. Preparation of the Conductive Layer

A coating solution for the conductive layer containing: 54.4 gm of water, 46.5 gm of 1:1 Nacrylic® 78-6178 solution/water, 15.1 gm of the shell type electroconductive powder particles prepared in Example 2, and 2.0 gm of PFAZ® 322 was prepared by the following procedure. For ease of handling the Nacrylic® 78-6178 solution was diluted with an equal weight of water and then added to the water. Then the electroconductive powder particles were added with stirring to the solution thus formed. Then 80 gm of 20/30 mesh zirconia beads, which served as a mixing aid, were added and the resulting mixture shaken for 6 min on a Red Devil paint shaker. The resulting suspension was decanted from the zirconia beads through a sieve of fine enough mesh to remove the zirconia beads and the PFAZ® 322 added just before coating. The composition of the coating solution is: 12.8% electroconductive powder particles, 9.8% Nacrylic® 78-6178 binder, 1.7% PFAZ® 322 and 24.3% total solids (powder/-polymer ratio: 1.3).

The coating solution was coated at room temperature onto 0.004–0.0045 in (100–115 μm) biaxially oriented dimensionally stable polyethylene terephthalate film base using a #6 Consler wirewound-rod and dried in a conventional laboratory film drier at 140° F. (60° C.) for 10 min to accelerate crosslinking. The film base was subbed on both sides as described in Alles U.S. Pat. No. 2,779,684 as modified by Rawlins in U.S. Pat. No. 3,443,950 and overcoated by a thin substratum of hardened gelatin. The coating of the conductive layer weight was 2.6 gm/$m^2$. The coating had a resistance of 3.5–5 megohms, measured as described in *Electrical Properties of Polymers*, by A. R. Blythe, Cambridge University Press, 1980, pp 132–139. The coated film containing the conductive layer had an optical density 0.16 as measured by a MacBeth TD927 optical transmission densitometer with "whitelight" filters using air as a reference.

Step 2. Preparation of the Dielectric Layer

A coating solution for the dielectric layer containing: 320 gm of water, 480 gm of 1:1 Nacrylic® 78-6178 solution/water, 48 gm of Min-U-Sil® 10, and 16 gm of PFAZ® 322 was prepared by the following procedure. The Nacrylic® 78-6178 solution/water was added to the water followed by the Min-U-Sil® 10. The PFAZ® 322 was added just before coating.

The coating solution was coated at room temperature onto the conductive layer formed in Step 1 using a #22 Consler wirewound-rod. A coating weight of 7.5 gm/$m^2$ was obtained for the dielectric layer. An optical density of 0.06 was measured as described above.

Step 3. Evaluation of the Electrographic Recording Film

For evaluation the film prepared in Step 2 was striped on each edge by placing a carbon dispersion (DAG155, Acheson Colloids) on top of the dielectric layer using a paint striping device used to stripe model cars. The film was stored in a humidity and temperature controlled room at the relative humidity and temperature at which it was to be evaluated for at least 0.5 hr before evaluation.

The film was evaluated at 70% relative humidity and 70° F. (21° C.) on a Versatec V80-F dielectric plotter using the self-test pattern to image the film. The dielectric plotter was housed in a humidity and temperature controlled room. An image density of 0.60 relative to the unimaged base, measured as described above using the unimaged base as the reference, was observed. For comparison, Du Pont DRC electrographic film, a conventional electrographic recording film, was also evaluated under the same conditions. An image density of 0.20–0.30 was observed on the conventional film.

EXAMPLES 5–6

These examples illustrate the preparation of electrographic recording films in which the conductive layer contains "shell type" based electroconductive powder particles and the dielectric layer is coated from aqueous media as well as the effect of cross-linking agent on charge decay time.

A coating solution for the conductive layer containing: 663 mL of water, 29 mL of 10% sodium hexametaphosphate, 193 gm of Nacrylic® 78-6178, 96 gm of the "shell type" electroconductive powder particles prepared as described in Example 2, and 18 gm of PFAZ® 322 was prepared as described in Example 4 (powder/polymer ratio: 1.0).

The coating solution was coated at room temperature onto the polyethylene terephthalate film described in Example 4 with a #10 Meyer rod. A coating weight of about 1.5 gm/m$^2$ was obtained. A resistance of about 1-5 megohms, which varied over the coating, was observed. This resistance did not vary significantly as the relative humidity, measured as described in Example 4, was changed from 30 to 70%.

A coating solution for the dielectric layer containing: 660 mL of water; 300 mL of Nacrylic® 78-6178, 20 gm of PFAZ® 322, and 20 gm of Acumist® A12 was prepared as described in Example 4 and coated on top of the conductive layer with a #22 Meyer rod to give a dry coating weight of about 7 gm/m$^2$.

Charge decay times (times for the charge to decay to one-half its initial value) were measured using a static charge analyzer (Model 276A, Monroe Electronics, Lyndonville, N.Y.). At 70% relative humidity charge decay times of greater than 30 sec were observed.

The procedure was repeated, except that PFAZ® 322 was omitted from both the conductive layer and the dielectric layers. At 70% relative humidity charge decay times of less than 1 sec were observed.

EXAMPLE 7

This example illustrates the preparation of an electrographic recording film in which the conductive layer contains mica based electroconductive powder particles and the dielectric layer is coated from aqueous media.

A coating solution for the conductive layer containing: 46 gm of water, 46.5 gm of 1:1 Nacrylic® 78-6178 solution/water, 9.3 gm of the mica based electroconductive powder particles prepared as described in Example 1, and 2.0 gm of PFAZ® 322 was prepared as described in Example 4. The coating solution was 9.0% electroconductive powder, 11.2% binder, 1 9% PFAZ® 322, and 22.1% total solids. (powder/polymer ratio: 0.8) The coating solution was coated with a #10 Meyer rod as described in Example 4. The resistance was 1.1-1.2 megohms; the optical density was 0.11.

The dielectric layer was prepared and coated following the procedure described in Step 2 of Example 4. The optical density of the final electrographic recording film was 0.07. The electrographic recording film was evaluated as described in Example 4. An image density of 0.60 was observed at 70% relative humidity.

EXAMPLE 8

This example illustrates an electrographic recording film in which the dielectric layer is coated from an organic solvent.

The procedure of Example 7 was repeated to produce a base on which was coated a conductive layer containing the mica based electroconductive powder particles described in Example 1.

A coating solution for the dielectric layer containing: 595 gm of 2-butanone, 475 gm of DeSoto Type 342, and 16 gm of Min-U-Sil® 10 was prepared and coated on top of the conductive layer with a #15 Meyer rod to produce coating weight of about 7 gm/m$^2$. It was not necessary to cross-link this polymer to achieve acceptable decay characteristics. A good image was obtained over a wide range of relative humidities. When tested at 70% relative humidity, image densities of 0.60, or greater, were obtained. Under the same conditions a conventional electrographic film (Du Pont DRC electrographic recording film) gave image densities of 0.20-0.40.

EXAMPLE 9

This example illustrates the preparation and evaluation of a series of electrographic recording films using mixtures of electroconductive powders in the conductive layer.

Following the procedure of Example 7, a series of coating solutions for the conductive layer, each containing: 46 gm of water, 46.5 gm of 1:1 Nacrylic® 78-6178 solution/water, 8.0 gm of electroconductive powder, and 2.0 gm of PFAZ® 322 were prepared (powder/polymer ratio: 0.7). As indicated in Table 1 below, the electroconductive powder was either the mica based powder prepared as described in Example 1, the shell type powder prepared as described in Example 2, or a mixture of these powders. The coating solution was coated with a #15 Consler rod. The coating weight was about 2 gm/m$^2$.

A coating solution for the dielectric layer containing 160 gm of water, 240 gm of 1:1 Nacrylic® 78-6178 solution/water, 1.5 gm of Acumist® A18, and 8 gm of PFAZ® 322 was prepared as described in Example 4. The coating solution was coated at room temperature onto the conductive layer using a #10 Consler rod. A coating weight of about 4.5 gm/m$^2$ was obtained for the dielectric layer.

The films were evaluated as described in Example 4. Results are shown in the following table.

| % Mica Based Particles[a] | Resistance (megohms) | Charge Decay Time (sec) 30%[b] | 45%[b] | 70%[b] | $D_{max}$ 70%[b] | $D_{min}$ 70%[b] |
|---|---|---|---|---|---|---|
| 100 | 0.55 | 480 | 162 | 34 | 0.53 | 0.06 |
| 75 | 1.20 | 216 | 133 | 28 | 0.75 | 0.06 |
| 50 | 3.10 | 146 | 114 | 25 | 0.85 | 0.09 |
| 25 | 4.20 | 81 | 78 | 9 | 0.95 | 0.11 |
| 0 | 10.30 | 49 | 28 | 3 | 0.85 | 0.06 |

[a]Amount of mica based electroconductive powder from Example 1 in the conductive layer. Remainder is the hollow shell type powder from Example 2.
[b]Relative humidity

EXAMPLE 10

This example illustrates the preparation and evaluation of an electrographic recording paper.

1. Preparation of the Electrographic Recording Paper

A mixture of the shell type electroconductive powder described in Example 3 (120.0 g), Rhoplex® TR 407 solution (392.8 g of an aqueous solution containing about 45.8% polymer), and 237.2 g of water was blended in a Waring blender at low speed for about 1 min and the resulting mixture transferred to a 1 gal (3.79 L) polyethylene bottle. The process was repeated until about 4 gallons (15.1 L) of coating solution was prepared.

The coating solution was coated onto 13 in (33 cm) Thilmany raw paper stock 0.00026 in (66 μm) thick using a rod coater with a 0.6 in (1.5 cm) diameter #0 Meyer rod. The coating solution was stirred for about 0.5 hr with an overhead rod mixer prior to coating. Coating conditions were: web speed, 71 ft/min (21.6 M/min); relative humidity, about 63%; dryer temperature, about 300° F. (149° C.); reverse gravure coat roll with a large take-up etched pattern, and the rod turning in a direction opposite to that of web travel. The coating weight was about 10 lb/ream (1.6 mg/cm$^2$).

The electroconductive powder containing layer was overcoated with two layers of an aqueous solution of a dielectric coating containing Atomite® calcium carbonate (55 wt. % total solids, Carboset® XL 11 (44.5 wt. %), and Calcofluor® dye (0.5 wt. %). Coating weights were 3.2 lb/ream (0.52 mg/cm$^2$) for the first layer and 2.6 lb/ream (0.42 mg/cm$^2$) for the second layer. Then the paper which had been overcoated with two dielectric layers was back coated (i.e., coated on the side opposite the dielectric layer) with an aqueous solution containing sodium nitrate (50 wt. % total solids) and Calgon® XLV (50 wt. % total solids) at a coating weight of 5.0 lb/ream (0.81 mg/cm$^2$). Resistivity of the conductive layer, measured with a Hewlett Packard Model 4329A high resistance meter, was 1.0×106 ohms. The 13 in (33 cm) wide, 500 ft (150 M) long roll of back coated paper was reduced to a width of 11 in (28 cm) by slitting off 1 in (2.5 cm) from either side and immediately wound onto an 11 in (28 cm) wide, 3 in (7.6 cm) inside diameter paper core of the type used on a Versatec V80-F dielectric printer/plotter. The surface resistivity of the paper, measured by placing the probes of a Hewlett Packard Model 4329A high resistance meter directly on the dielectric layer coated side of the paper, was greater than $1\times10^9$ ohms indicating that the particles of electroconductive powder have not broken through the dielectric layer 2. Evaluation of the Dielectric Recording Paper Both the non-back coated and back coated papers prepared in Step 1 were evaluated on a Versatec V80-F dielectric printer/plotter using the self-test pattern to image the paper. For comparison, James River Graphics Report Grade electrographic paper, a standard commercial electrographic recording paper, was also evaluated under the same conditions. The tests were carried out in a Thermotron temperature and humidity chamber. The printer/plotter and paper were held in the chamber at the temperature and humidity conditions for 12 hr before each test was run.

The image quality observed at each relative humidity at which these papers were evaluated is indicated in Table 1 below.

TABLE 1

| RH[a] | Non-Black Coated Paper |
|---|---|
| 10% | no image |
| 20% | poor image quality due to gray banding |
| 30% | poor image quality due to gray banding |
| 40% | no image |
| 50% | black image but poor image quality due to gray banding |
| 60% | black image but poor image quality due to gray banding |
| 80% | lighter image with fair image quality |
| 95% | faded image with poor image quality |
| **RH[a]** | **Back Coated Paper** |
| 10% | black, uniform image with good density and quality |
| 20% | black, uniform image with good density and quality |
| 30% | black, uniform image with good density and quality |
| 40% | black, uniform image with good density and quality |
| 50% | black, uniform image with good density and quality |
| 60% | black, uniform image with good density and quality |
| 80% | slightly lighter image with fair quality |
| 95% | faded image with poor image quality |
| **RH[a]** | **Commercial Paper** |
| 10% | faded, streaked image with poor density and quality |
| 20% | faded, streaked image with poor density and quality |
| 30% | slightly streaked image with fair density and quality |
| 40% | light vertical streaks, good density and fair quality |
| 50% | black, uniform image with good density and quality |
| 60% | black, uniform image with good density and quality |
| 80% | black, uniform image with good density and quality |
| 95% | black, uniform image with good density and quality |

[a]Evaluations were carried out at 70° F. (21° C.) except for the evaluation at 95% RH which was carried out at 85° F. (29° C.).

We claim:

1. An electrographic recording element with reduced sensitivity to humidity, comprising, in order:
   (1) a base,
   (2) a conductive layer comprising a continuous coating of an electroconductive composition, said electroconductive composition comprising:
      (a) a polymeric binder and
      (b) an electroconductive powder comprising particles being:
         (i) hollow shells of amorphous silica or a silica-containing material, or
         (ii) solid cores coated with amorphous silica or a silica-containing material, coated with a two-dimensional network of antimony-containing tin oxide crystallites in which the antimony content ranges from 1 to about 30% by weight of tin oxide; and
   (3) a dielectric layer.

2. The element of claim 1 wherein said base is paper.

3. The element of claim 1 wherein said base is a polymer film.

4. The element of claim 1 wherein the ratio of the weight of said electroconductive powder to said polymeric binder is about 0.5 to about 1.5.

5. The element of claim 4 wherein said conductive layer has a coating weight of about 1 to about 20 g/m$^2$.

6. The element of claim 1 wherein said electroconductive powder is a mixture of two or more different sized electroconductive powder particles.

7. The element of claim 1 wherein the ratio of the weight of said electroconductive powder to said polymeric binder is about 0.5 to about 1.5.

8. The element of claim 1 wherein said particles comprise an inert core.

9. The element of claim 1 wherein said particles are hollow shells.

10. The element of claim 1 wherein said base is a polymer film.

11. The element of claim 1 wherein said electroconductive power is a mixture of two or more different sized electroconductive powder particles.

12. The element of claim 10 wherein said polymeric binder is a cross-linked polymer.

13. The element of claim 10 wherein said dielectric layer is a cross-linked polymer.

14. The element of claim 10 wherein both said dielectric layer and said conductive layer are coated from water.

15. The element of claim 10 additionally comprising a grounding stripe on the edge of the dielectric layer.

16. The element of claim 10 wherein said base is polyethylene terephthalate film.

17. The element of claim 10 wherein said electroconductive power is a mixture of two or more different sized electroconductive powder particles.

18. The element of claim 16 wherein said electroconductive powder comprises mica cores.

19. The element of claim 16 wherein the ratio of the weight of said electroconductive powder to said polymeric binder is about 0.6 to about 1.3.

20. The element of claim 16 wherein said polymeric is a cross-linked polymer.

21. The element of claim 16 wherein said dielectric layer is a cross-linked polymer.

22. The element of claim 16 wherein said conductive layer has a coating weight of about 1 to about 8 $gm/m^2$.

23. The element of claim 16 wherein said dielectric layer is a cross-linked polymer, said polymeric binder is a cross-linked polymer, said electroconductive powder comprises mica core powder particles, the ratio of the weight of said electroconductive powder to said polymeric binder is about 0.6 to about 1.3, and said conductive layer has a coating weight of about 1 to about 8 $gm/m^2$.

24. The element of claim 16 wherein said electroconductive powder is a mixture of about 25% by weight to about 75% by weight of one sized particle, and about 75% weight to about 25% by weight is a different sized particle based on the total weight of electroconductive powder.

25. The element of claim 23 additionally comprising a grounding stripe on the edge of the dielectric layer.

26. The element of claim 23 wherein both said dielectric layer and said conductive layer are coated from water.

27. The element of claim 1 wherein said base is paper.

28. The element of claim 27 wherein said polymeric binder is a cross-linked polymer.

29. The element of claim 27 wherein said dielectric layer is a cross-linked polymer.

30. The element of claim 27 additionally comprising a back coating of an aqueous salt solution.

31. The element of claim 27 additionally comprising an ionic conductor in the paper.

32. The element of claim 27 wherein the ratio of the weight of said electroconductive powder to said polymeric binder is about 0.6 to about 1.3.

33. The element of claim 27 wherein said conductive layer has a coating weight of about 1 to about 20 $gm/m^2$.

34. The element of claim 27 wherein said dielectric layer is a cross-linked polymer, said polymeric binder is a cross-linked polymer, and the ratio of the weight of said electroconductive powder to said polymeric binder is about 0.6 to about 1.3.

35. The element of claim 27 wherein said electroconductive powder is a mixture of about 25% by weight to about 75% by weight of one sized particle, and about 75% by weight to about 25% by weight is a different sized particle based on the total weight of electroconductive powder.

36. The element of claim 1 wherein the cores essentially do not contain silica.

* * * * *